US012745327B2

(12) United States Patent
Alonso Esteban et al.

(10) Patent No.: US 12,745,327 B2
(45) Date of Patent: Sep. 22, 2026

(54) COOKING SYSTEM

(71) Applicant: BSH Hausgeräte GmbH, Munich (DE)

(72) Inventors: Rafael Alonso Esteban, Huesca (ES); Pilar Blasco Herranz, Saragossa (ES); Javier Lasobras Bernad, Ejea de Caballeros (ES); Sergio Llorente Gil, Saragossa (ES); Damaso Martin Gomez, Saragossa (ES); Cristina Pelayo Gil, Saragossa (ES); Julio Rivera Peman, Cuarte de Huerva (ES)

(73) Assignee: BSH Hausgeräte GmbH, Munich (DE)

( * ) Notice: Subject to any disclaimer, the term of this patent is extended or adjusted under 35 U.S.C. 154(b) by 667 days.

(21) Appl. No.: 18/265,719

(22) PCT Filed: Nov. 18, 2021

(86) PCT No.: PCT/EP2021/082125
§ 371 (c)(1),
(2) Date: Jun. 7, 2023

(87) PCT Pub. No.: WO2022/122337
PCT Pub. Date: Jun. 16, 2022

(65) Prior Publication Data
US 2024/0040676 A1 Feb. 1, 2024

(30) Foreign Application Priority Data
Dec. 11, 2020 (EP) .................................... 20383082

(51) Int. Cl.
*H05B 6/12* (2006.01)
*F24C 7/08* (2006.01)

(52) U.S. Cl.
CPC ........... *H05B 6/1209* (2013.01); *F24C 7/083* (2013.01); *H05B 2213/05* (2013.01); *H05B 2213/07* (2013.01)

(58) Field of Classification Search
CPC ................ H05B 2213/07; H05B 6/062; H05B 2213/05; H05B 6/1218; H05B 3/746;
(Continued)

(56) References Cited

U.S. PATENT DOCUMENTS

2023/0043515 A1* 2/2023 Weder ...................... H05B 6/10

FOREIGN PATENT DOCUMENTS

JP 2004227839 A 8/2004
JP 2006294286 A 10/2006
WO 2008010435 A1 1/2008

OTHER PUBLICATIONS

Llorente, EP 2925086 A1 (Year: 2015).*
(Continued)

*Primary Examiner* — Vy T Nguyen
(74) *Attorney, Agent, or Firm* — Michael E. Tschupp; Andre Pallapies; Brandon G. Braun

(57) ABSTRACT

A cooking system includes a set-down plate for setting down cookware, and a detection unit designed to detect the cookware. The detection unit includes a radiation source for emitting electromagnetic radiation and a radiation detector for receiving electromagnetic radiation. A first radiation guiding element transmits the electromagnetic radiation from the radiation source to a set-down region of the set-down plate, and a second radiation guiding element transmits electromagnetic radiation reflected from the cookware to the radiation detector.

20 Claims, 1 Drawing Sheet

(58) Field of Classification Search
CPC .... H05B 6/12; H05B 2213/03; H05B 3/0076; H05B 3/74; H05B 3/744; H05B 6/1209; H05B 6/1254; H05B 6/02; H05B 6/10; H05B 6/1245; F24C 7/083; F24C 7/00; F24C 14/00; F24C 15/10; F24C 15/105; F24C 7/085; G01K 11/00; G01K 2207/06; G02B 6/0015; G02B 6/0035; G02B 6/0055; G02B 6/0065; G02B 6/0073; G02B 6/0096
USPC .................... 219/446.1, 622, 624; 250/338.1
See application file for complete search history.

(56) References Cited

OTHER PUBLICATIONS

Zaizen, JP 2006294286 A (Year: 2006).*
Tsubaki, JP 2008226574 A (Year: 2008).*
International Search Report PCT/EP2022/0182125 dated Feb. 10, 2022.

* cited by examiner

COOKING SYSTEM

CROSS-REFERENCES TO RELATED APPLICATIONS

This application is the U.S. National Stage of International Application No. PCT/EP2021/082125, filed Nov. 18, 2021, which designated the United States and has been published as International Publication No. WO 2022/122337 A1 and which claims the priority of European Patent Application, Serial No. 20383082.3, filed Dec. 11, 2020, pursuant to 35 U.S.C. 119(a)-(d).

The contents of International Application No. PCT/EP2021/082125 and European Patent Application, Serial No. 20383082.3 are incorporated herein by reference in their entireties as if fully set forth herein.

BACKGROUND OF THE INVENTION

The invention relates to a cooking system.

Cooktops with detection units for detecting cookware are already known from the prior art. Cookware is usually detected in known cooktops by means of inductive measurements, for instance on the basis of measurements of an inductance or resonance frequency which has changed when the cookware is set down. In the case of induction cooktops, inductive measurements for detecting cookware can be carried out directly by means of inductors, which are also used to heat up cookware. The disadvantages here are however large inaccuracies in the detection, as a result of which separate additional induction coils for high-resolution inductive measurements are used increasingly in order to detect cookware. Detection units of this type are disadvantageous however in that higher costs and thus a lower efficiency are associated therewith. Cooktops with detection units for detecting cookware are moreover known, which carry out a detection by means of optical methods, wherein in order to detect electromagnetic radiation emitted by a radiation source and radiation reflected by cookware, which is fed to a detector, were previously transported in the same radiation guiding element, which may disadvantageously result in interferences between emitted and reflected radiation and thus in error-prone and inaccurate measurements.

BRIEF SUMMARY OF THE INVENTION

The object of the invention consists in particular, but is not restricted thereto, in providing a cooking system with improved properties with respect to efficiency.

A cooking system, in particular an induction cooking system, is proposed, having a set-down plate for setting down cookware, having a detection unit for detecting cookware, which has at least one radiation source for emitting electromagnetic radiation and at least one radiation detector for receiving electromagnetic radiation, having a first radiation guiding element for transmitting the electromagnetic radiation from the radiation source to a set-down region of the set-down plate and having a second radiation guiding element for transmitting electromagnetic radiation reflected from the cookware to the radiation detector.

By means of an embodiment of this type, a particularly efficient cooking system can advantageously be provided. In particular, compared with previously known cooktops with units for detecting cookware, the mode of operation of which is based on inductive measurements, a reduction in costs can advantageously be achieved when the detection unit for detecting the cookware has at least one radiation source for emitting electromagnetic radiation and at least one radiation detector for receiving electromagnetic radiation. Moreover, a particularly simple assembly can advantageously be enabled. Furthermore, in addition to detecting cookware, the temperature of the cookware can advantageously also additionally be detected by means of the detection unit. Moreover, compared with previously known cooktops, in which an electromagnetic radiation emitted to detect a radiation source and radiation reflected by cookware, which is fed to a detector, are transported in the same radiation guiding element, an accuracy and reliability of the detection can be clearly increased and a cooking system with a particularly high-resolution detection of cookware can advantageously be provided.

A "cooking system" is to be understood to mean a system which has at least one set-down plate, the detection unit and the first radiation guiding element and the second radiation guiding element, and which could have in particular in addition at least one further unit. The cooking system can be embodied at least as one part, in particular as a subassembly, of a cooktop, in particular of an induction cooktop, wherein accessory units for the cooktop can also be included in particular additionally in the cooking system. For instance, the cooking system could have at least one cooktop object, which could be in particular a subassembly of a cooktop. The cooktop object could have for instance at least one control unit and/or at least one user interface and/or at least one housing unit and/or at least one heating unit and/or at least one draw-off fan unit and/or at least one heating unit control electronics unit.

A "set-down" plate is to be understood to mean an in particular plate-type unit, which is provided in at least one operating state for setting down at least one item of cookware and/or for placing at least one food product for the purpose of heating. The set-down plate can be embodied as a hotplate. The set-down plate embodied as a hotplate can embody at least one part of an external cooktop housing and in particular together with at least one external housing unit, with which the set-down plate embodied as a hotplate could be connected in particular in at least one assembled state, embody the external cooktop housing at least to a large extent. The set-down plate could alternatively or in addition be embodied as a worktop or as a subregion of at least one worktop, in particular at least one kitchen worktop, in particular of the cooking system. The set-down plate could be formed at least to a large extent from glass and/or glass ceramic and/or from Neolith and/or from Dekton and/or from wood and/or marble and/or from stone, in particular from natural stone, and/or from laminate and/or from metal and/or from plastic and/or from ceramic, for instance.

A "radiation source" is to be understood to mean a unit which has at least one radiation element, and which, in at least one operating state, provides electromagnetic radiation, in particular infrared radiation and/or visible light, in particular by means of the radiation element. "Infrared radiation" is to be understood to mean electromagnetic radiation from a spectral range of between 800 nm and 7000 nm. "Visible light" is to be understood to mean electromagnetic radiation from a spectral range of between 380 nm and 780 nm.

A "radiation detector" is to be understood to mean in particular an optoelectronic component, which is provided to convert electromagnetic radiation striking thereupon into an electric detection signal, preferably using the photoelectric effect. For the purpose of detecting electromagnetic radiation, the radiation detector preferably comprises at least one photodiode, which can be embodied in particular as a pin photodiode and/or as an avalanche photodiode and/or an MSM photodiode. For the purpose of detecting electromagnetic radiation, the radiation detector could, alternatively or in addition to a photodiode, also comprise a photocell and/or a photomultiplier and/or an active pixel sensor and/or a CCD sensor and/or a phototransistor and/or a photo resistor, for instance.

The detection unit has, in addition to the radiation source and the radiation detector, a computing unit, for instance a microprocessor. The computing unit of the detection unit is provided to compare an electrical detection signal generated from the reflected electromagnetic radiation by means of the radiation detector with a reference signal, which is measured in a reference state in which no cookware is set down on the set-down plate, and to derive the presence of cookware set down on the set-down plate from a deviation of the detection signal from the reference signal. The computing unit preferably has a storage unit, in which the reference signal is stored.

A "radiation guiding element" is to be understood to mean an element which is permeable at least partially for electromagnetic radiation and which transmits, in particular transports, electromagnetic radiation in the longitudinal extension direction of the radiation guiding element, preferably by way of total reflections within the radiation guiding element. The radiation guiding element preferably at least substantially prevents at least electromagnetic radiation from entering and/or leaving in directions aligned at least substantially at right angles to the longitudinal extension direction of the radiation guiding element. The radiation guiding element preferably has a temperature resistance of at least 250° C. The radiation guiding element is preferably embodied to be at least substantially dimensionally stable and resilient and has a material and/or consists at least to a large extent from a material, the elasticity module of which, in particular as a function of a diameter of the radiation guiding element, is selected such that the radiation guiding element can be deformed sufficiently elastically and is at the same dimensionally stable. The radiation guiding element preferably has a material with an elasticity module of between 2500 Mpa and 4500 Mpa and is embodied in particular from such a material. The radiation guiding element could be embodied at least to a large extent, in particular entirely, from quartz. The radiation guiding element advantageously has at least one thermoplastic plastic, in particular a plastic from the group comprising methacrylpolymerisate, preferably polymethylmethacrylate (PMMA), particularly preferably polymethacrylmethylimide (PMMI), and is embodied in particular at least to a large extent from such a thermoplastic plastic. The radiation guiding element can have an external layer with a refractive index which is lower compared with a core of the radiation conductor and which surrounds the core preferably entirely in the longitudinal extension direction. The external layer can be embodied in one piece with the core or be embodied as a coating, for instance as a coating made from silicon germanium. The external layer could be applied as a coating to the core of the radiation guiding element by means of a coating method, in particular by means of a screen printing method, by means of spin coating, by means of dip coating, by means of a Sol-Gel method, by means of spraying, by means of an ink jet printing method, by means of a chemical vapor deposition (CVD) and/or by means of a physical vapor deposition (PVD). The external layer could have and/or consist of inorganic materials, in particular glass, for instance. The external layer is preferably manufactured from a plastic. The core and the external layer are particularly preferably manufactured from substantially the same material, in particular in a two-component injection molding process.

The expression "at least to a large extent" is to be understood to mean an amount of substance of at least 55%, advantageously at least 65%, preferably at least 75%, particularly preferably at least 85% and particularly advantageously at least 95%. A "longitudinal extension direction" of an object is to be understood to mean in particular a direction which is aligned parallel to a longest side of a smallest notional geometric cuboid, which barely surrounds the object completely. The expression "substantially at right angles" is here to define in particular an alignment of a direction relative to a reference direction, wherein the direction and the reference direction, in particular viewed in a plane, draw an angle of 90°, and the angle has a maximum deviation of in particular less than 8°, advantageously less than 5° and particularly advantageously less than 2°. The cooking system can, in addition to the first radiation guiding element and the second radiation guiding element, have one or more further radiation guiding elements, which, in the assembled state, can be arranged offset relative to one another with respect to the main extension plane of the set-down plate.

In the present application, numerals, such as for instance "first" and "second", which precede specific terms, are only used to differentiate between objects and/or an assignment between objects with one another and do not apply an existing overall number and/or ranking of objects. In particular, a "second object" does not necessarily imply a presence of a "first object".

"Provided" is to be understood to mean especially programmed and/or designed and/or equipped. The fact that an object is provided for a specific function is preferably to be understood to mean that the object fulfills and/or carries out this specific function in at least one application and/or operating state.

Moreover, it is proposed that the radiation source is provided to emit modulated, electromagnetic radiation. In this way, a particularly accurate and reliable detection of cookware can advantageously be enabled by means of the detection unit. The radiation source comprises at least one modulator for modulating electromagnetic radiation. The modulator can be part of a radiation element of the radiation source or be embodied as an external modulator, for instance as an electro-optical modulator or as a magneto-optical modulator, which interacts with a radiation element of the radiation source for emitting modulated electromagnetic radiation. The modulated electromagnetic radiation can be modulated by means of amplitude modulation and/or by means of frequency modulation and/or by means of phase modulation and/or by means of polarization modulation.

Furthermore, it is proposed that the radiation source has at least one IR radiation element, which is provided to emit infrared radiation. The IR radiation element can be embodied for instance as a quartz radiator or as a halogen radiator or as an infrared lamp or as a globar. The IR radiation guiding element is preferably embodied as a laser, for instance as an Nd-YAG laser, and provides monochromatic infrared radiation.

Furthermore, it is proposed that the cooking system has an optical filter, which is arranged upstream of the radiation detector and is provided for filtering short-wave spectral parts from the reflected electromagnetic radiation. In this way, a detection can advantageously be further improved. If the cooking system has an optical filter, which is arranged upstream of the radiation receiving element, it is advantageously possible to prevent short-wave spectral parts from the reflected electromagnetic radiation, in particular short-wave spectral parts of electromagnetic radiation from the spectrum of the visible light, from striking the radiation detector and thus to achieve a particularly reliable and accurate detection of cookware and/or a temperature of cookware. The optical filter is preferably embodied as a long-pass filter and is permeable for long-wave spectral parts of the electromagnetic radiation, in particular for long-wave spectral parts from the spectrum of infrared radiation, while the optical filter is impermeable for short-wave spectral parts, in particular for short-wave spectral parts from the spectrum of visible light. The optical filter can be embodied for instance as an edge filter.

The optical filter could be arranged between the radiation detector and the second radiation guiding element. In an advantageous embodiment, it is however proposed that the optical filter is integrated in the second radiation guiding element. In this way a space saving can advantageously be reached and a particularly compact cooking system can thus be provided. The optical filter can be integrated in the second radiation guiding element, by for instance at least one subregion, in particular an end region facing the radiation detector in an assembled state of the cooking system, of the second radiation guiding element being doped. A doping of the radiation guiding element can be introduced into the radiation guiding element for instance by means of an RIE method, (reactive ion etching).

Furthermore, it is proposed that the detection unit is provided for detecting a temperature of the cookware on the basis of the reflected electromagnetic radiation. By means of an embodiment of this type, a user convenience of the cooking system can advantageously be increased. The detection unit is preferably provided to determine a temperature of the cookware on the basis of the electrical detection signal, which is generated by means of the radiation detector from the reflected electromagnetic radiation, by means of the computing unit and namely at least approximately applying the Stefan-Boltzmann law, wherein in particular deviations in the radiation properties of the cookware can be taken into consideration by an ideal black emitter, for instance by means of correction factors.

Moreover, it is proposed that the cooking system has a fastening unit for fastening the first radiation guiding element and the second radiation guiding element below the set-down plate. In this way, it is advantageously possible to fasten the first radiation guiding element and the second radiation guiding element below the set-down plate using simple technical means. The fastening unit preferably forms at least one fastening region, in which the first radiation guiding element and the second radiation guiding element are fastened. A fastening of the first radiation guiding element and the second radiation guiding element in the fastening region of the fastening unit can be realized in particular by means of a form-fit and/or force-fit and or material-bonded connection. It is conceivable for instance for the first radiation guiding element and/or the second radiation guiding element to be glued or welded to the fastening unit in a material-bonded manner in the fastening region. Alternatively or in addition, it is conceivable for the fastening unit to have at least one fastening element, by means of which the first radiation guiding element and/or the second radiation guiding element is/are fastened to the fastening unit in a form-fit and/or force-fit manner, for instance by way of a latching and/or plug-in connection and/or by means of a screw connection. The term "below" relates to a installation position of the set-down plate in respect of the set-down plate. In an installation position of the set-down plate, a region above the set-down plate faces a user with a viewing direction at right angles to a main extension plane of the set-down plate, while a region below the set-down plate is located on the opposite side above the region and faces away from the user.

Furthermore, it is proposed that the first radiation guiding element and the second radiation guiding element are arranged in a self-supporting manner on the fastening unit starting from a fastening region. In this way, assembly of the first radiation guiding element and the second radiation guiding element can advantageously be improved. In particular, a number of fastening elements of the fastening unit can advantageously be reduced, in particular minimized, as a result of which material costs and/or assembly costs can advantageously be reduced. A first section of the first radiation guiding element comprising a first end region of the first radiation guiding element and a second section comprising a second end region of the second radiation guiding element are preferably arranged in each case in a self-supporting manner. The fact that the first radiation guiding element and the second radiation guiding element are arranged in a self-supporting manner on the fastening unit starting from the fastening region is to be understood in this context in particular to mean that the first radiation guiding element and the second radiation guiding element extend and/or protrude and/or project starting from the fastening region, in which they are fastened by means of at least one fastening element of the fastening unit, into a further region lying outside of the fastening region, in particular in the direction of the set-down plate, and in this region are arranged without additional fastening elements, wherein the first radiation guiding element and the second radiation guiding element to this end have in particular sufficient stability in order to retain at least substantially permanently the arrangement in the further region. The first end region of the first radiation guiding element and the second end region of the second radiation guiding element preferably make contact with the set-down plate without an additional fastening, in particular permanently.

Furthermore, it is proposed that a first end region of the first radiation guiding element and a second end region of the second radiation guiding element make contact with the set-down plate. An "end region" of a radiation guiding element is to be understood to mean a region which comprises at least one point and/or a surface of the radiation guiding element, through which the electromagnetic radiation transmitted and/or transported by the radiation guiding element leaves the radiation guiding element and/or enters the radiation guiding element and which extends from this point and/or this surface in the radial direction of the radiation guiding element as far as an external surface of the radiation guiding element. The first end region and the second end region preferably has a purely convex form in each case. The end region extends starting from the point and/or the surface of the radiation guiding element, through which the electromagnetic radiation transmitted and/or transported by the radiation guiding element enters or leaves, in the direction of a longitudinal extension of the radiation guiding element preferably by a length of between 0.1% and 5% of an overall longitudinal extension of the radiation guiding element. The end region extends starting from the point and/or the surface of the radiation guiding element, through which the electromagnetic radiation transmitted and/or transported by the radiation guiding element enters or leaves, preferably by a length of at least 1 mm. The fact that a first object "makes contact with" a second object is to be understood to mean that a distance between the first and second object in the region of the contacting is insignificantly small and in particular amounts to zero.

Furthermore, it is proposed that the first end region and the second end region are arranged at a distance of at most 5 mm relative to one another when observed at right angles to the set-down plate. By means of an embodiment of this type, the electromagnetic radiation reflected by the cookware can advantageously be received particularly reliably and with and minimal losses by the second radiation guiding element and transmitted to the radiation detector. In this way, a particularly reliable detection of the cookware and/or the temperature of the cookware can further advantageously be enabled. When viewed at right angles to the set-down plate, the first end region and the second end region are preferably arranged at a distance of at most 4 mm, particularly preferably at a distance of at most 3 mm relative to one another.

Moreover, it is proposed that the radiation source has at least one light radiation element, which is provided to emit visible light for the purpose of illuminating the set-down region. By means of an embodiment of this type, a user convenience of the cooking system can advantageously be increased. For instance, it is conceivable for a switch-on state and/or specific operating mode of the cooking system, in particular different operating modes by means of visible light in different colors, to be able to be displayed to a user by means of the visible light emitted by the light radiation element. The light radiation element of the radiation source could be embodied for instance as a back-lit display unit, in particular as a matrix display unit, preferably as an LCD display or as an OLED display. The light radiation guiding element is particularly preferably embodied as an LED, in particular as an RGB LED.

Furthermore, it is proposed that the set-down plate is embodied as a hotplate. In this way, a particularly efficient cooking system can advantageously be provided as a subassembly of a cooktop.

The cooking system is not to be restricted here to the above-described application and embodiment. In particular, in order to fulfill a mode of operation described here, the cooking system can have a number of individual elements, components and units which deviates from a number cited herein.

Further advantages result from the following description of the drawing. In the drawing, an exemplary embodiment of the invention is shown. The drawing, the description and the claims contain numerous features in combination. The person skilled in the art will expediently also consider the features individually and combine them to form useful further combinations.

DETAILED DESCRIPTION OF EXEMPLARY EMBODIMENTS OF THE PRESENT INVENTION

Figure 1:
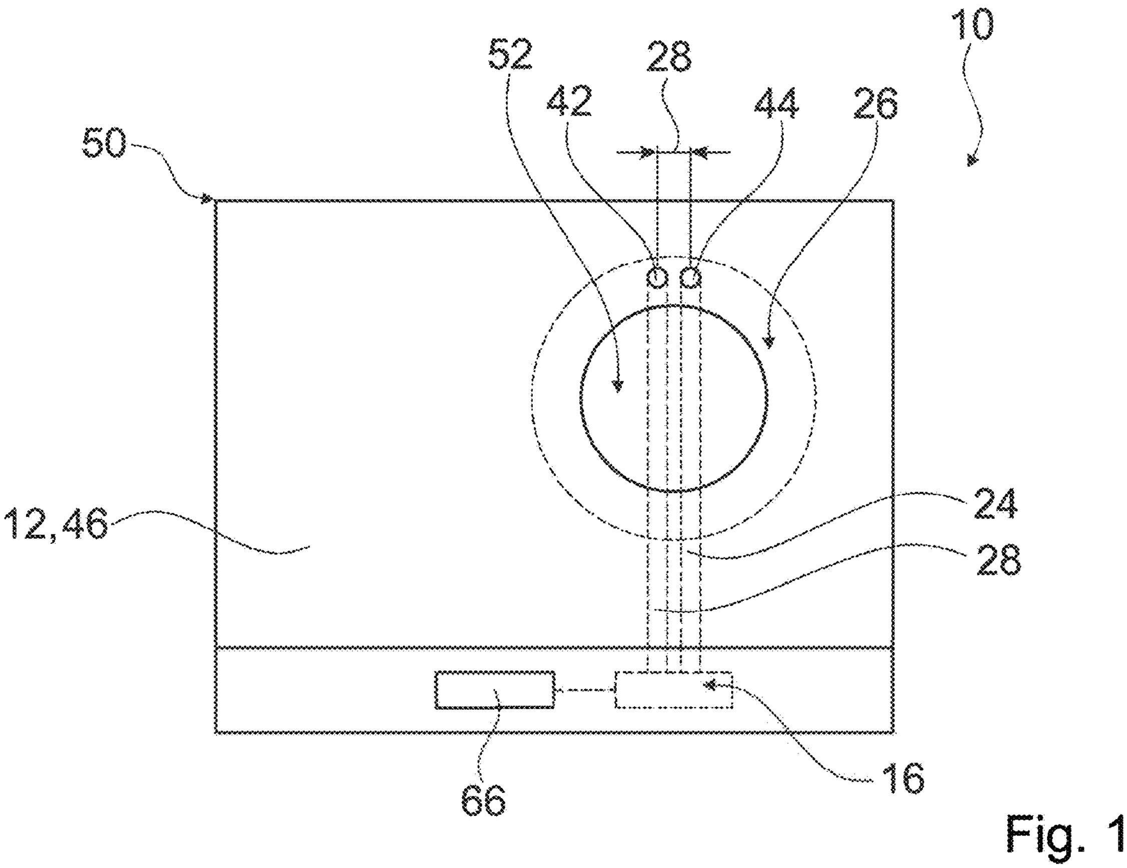
FIG. 1 shows a cooking system with a detection unit, a first radiation guiding element and a second radiation guiding element in a schematic top view.

FIG. 1 shows a cooking system 10 in a schematic top view. The cooking system 10 is embodied as an induction cooking system, namely as a subassembly of an induction cooktop 50.

Figure 2:
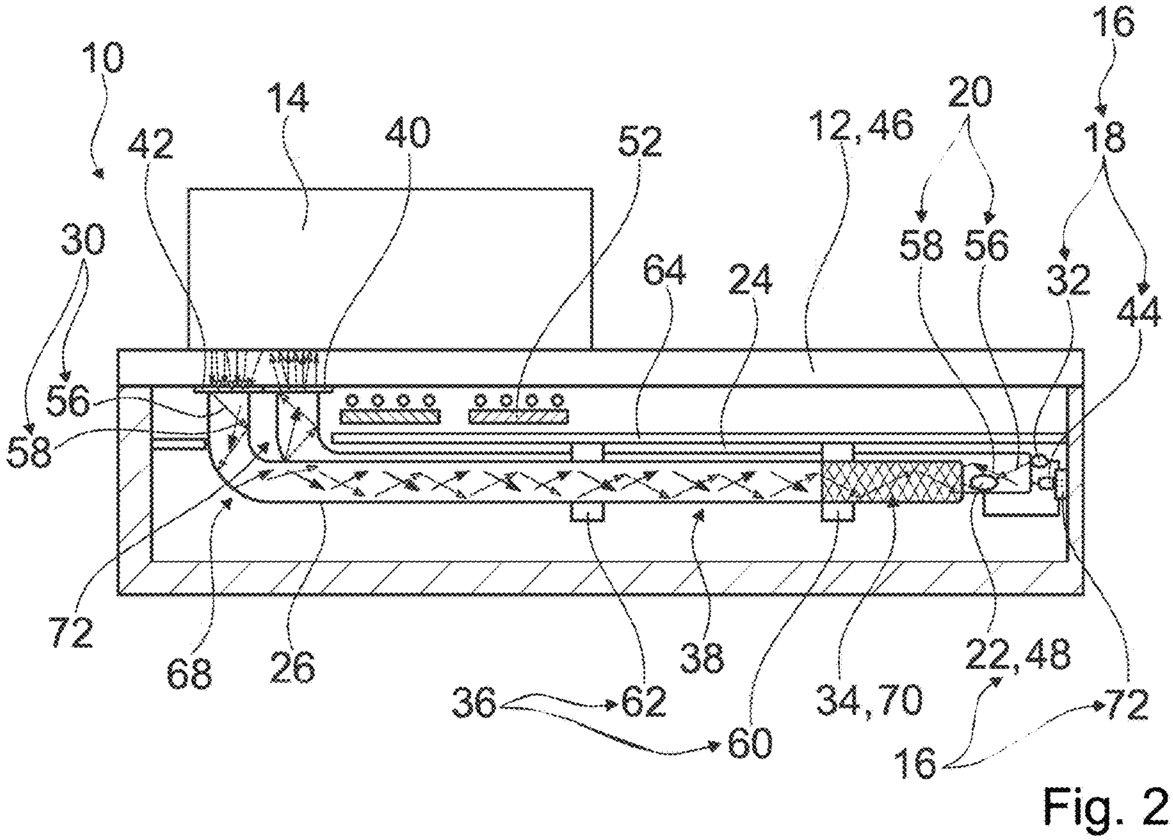
FIG. 2 shows the cooking system in a schematic side view.

The cooking system 10 comprises a set-down plate 12 for setting down cookware 14 (cf. FIG. 2). The set-down plate 12 is embodied here as a hotplate 46 of the induction cooktop 50. Alternatively, the set-down plate could however be embodied as a kitchen worktop (not shown).

The cooking system 10 has a detection unit 16 for detecting the cookware 14. The detection unit 16 is connected to a control unit 66 of the induction cooktop 50. The induction cooktop 50 comprises an inductor 52 for heating the cookware 14. The inductor 52 is arranged below a set-down region 26 for setting down the cookware 14. In an operating state of the cooking system 10, the detection unit 16 transmits information relating to a detection of the cookware 14 to the control unit 66, so that the inductor 52 can be controlled by the control unit on the basis of this information.

FIG. 2 shows the cooking system 10 in a schematic side view.

The detection unit 16 comprises at least one radiation source 18 for emitting electromagnetic radiation 20 and at least one radiation detector 22 for receiving electromagnetic radiation 20.

The radiation source 18 has at least one IR radiation element 32, which is provided for emitting electromagnetic radiation 20 in the form of infrared radiation 56. The IR radiation element 32 is embodied as an Nd-YAG laser.

The radiation source 18 has at least one light radiation element 44. The light radiation element 44 is provided for emitting electromagnetic radiation 20 in the form of visible light 58 for the purpose of illuminating the set-down region 26. The light radiation element 44 is embodied here as an LED, namely as an RGB LED.

The radiation source 18 is provided to emit modulated electromagnetic radiation 20. The radiation source 18 is provided here to emit modulated electromagnetic radiation 20 in the form of modulated infrared radiation 56. The infrared radiation 56 is frequency modulated, namely by means of the IR radiation element 32.

The cooking system 10 has a first radiation guiding element 24 for transmitting the electromagnetic radiation 20 from the radiation source 18 to the set-down region 26 of the set-down plate 12. The cooking system has a second radiation guiding element 28 for transmitting electromagnetic radiation 30 reflected by the cookware 14.

The cooking system 10 has an optical filter 34. The optical filter 34 is arranged upstream of the radiation detector 22 and provided to filter short-wave spectral parts from the reflected electromagnetic radiation 30. The optical filter 34 is integrated here in the second radiation guiding element 28. The optical filter 32 is embodied as a doped region 70 of the second radiation guiding element which is permeable for reflected electromagnetic radiation 30 in the form of infrared radiation 56 and impermeable for reflected electromagnetic radiation 30 in the form of visible light 58.

The radiation detector 22 of the detection unit 16 is embodied here as a photodiode 48. Reflected electromagnetic radiation 30 striking the radiation detector 22 is converted by the radiation detector 22 into an electrical detection signal (not shown).

The detection unit 16 has a computing unit 72. In the operating state of the cooking system 10, the computing unit 72 compares the detection signal with a stored reference signal (not shown), which was measured in a state in which no cookware 14 is set down on the set-down region 26 of the set-down plate 12, and determines therefrom a presence or absence of cookware 14 in the set-down region 26.

The detection unit 16 is moreover provided to detect a temperature of the cookware 14 on the basis of the reflected electromagnetic radiation 30. The temperature of the cookware 14 is determined in the operating state of the cooking system 10 on the basis of the detection signal generated from the reflected electromagnetic radiation 30 by means of the radiation detector 22. The temperature of the cookware 14 is determined from the detection signal here in the computing unit, namely by at least approximately applying the Stefan-Boltzmann law, wherein deviations in the radiation properties of the cookware 14 from an ideal black emitter are taken into consideration by means of correction factors.

The cooking system 10 has a fastening unit 36 for fastening the first radiation guiding element 24 and the second radiation guiding element 28 below the set-down plate 12. The first radiation guiding element 24 and the second radiation guiding element 28 are fastened in a fastening region 38 by means of a fastening element 60 and by means of a further fastening element 62 of the fastening unit 36. The first radiation guiding element 24 and the second radiation guiding element 28 are arranged in a self-supporting manner on the fastening unit starting from the fastening region 38. The fastening region 38 runs below a shielding element 64, which is provided to electromagnetically shield the inductor 52. In a bending region 68 the first radiation guiding element 24 and the second radiation guiding element 28 are bent in each case in the direction of the set-down plate 12 and guided through an opening 72 in the shielding element 64.

A first end region 40 of the first radiation guiding element 24 and a second end region 42 of the second radiation guiding element 28 make contact with the set-down plate 12.

The first end region 40 and the second end region 42 of the second radiation guiding element 28 are arranged at a distance of at most 5 mm (cf. FIG. 1) relative to one another (cf. FIG. 1).

The invention claimed is:

1. A cooking system, comprising:

a set-down plate for setting down cookware;

a detection unit designed to detect the cookware, said detection unit including a radiation source for emitting electromagnetic radiation and a radiation detector for receiving electromagnetic radiation;

a first radiation guiding element designed to transmit the electromagnetic radiation from the radiation source to a set-down region of the set-down plate;

a second radiation guiding element designed to transmit electromagnetic radiation reflected from the cookware to the radiation detector; and an optical filter arranged upstream of the radiation detector, wherein the optical filter is integrated in the second radiation guiding element.

2. The cooking system of claim 1, constructed in a form of an induction cooking system.

3. The cooking system of claim 1, wherein the radiation source is designed to emit modulated electromagnetic radiation.

4. The cooking system of claim 1, wherein the radiation source includes an IR radiation element designed to emit infrared radiation.

5. The cooking system of claim 1, wherein the optical filter is designed to filter short-wave spectral parts from the reflected electromagnetic radiation.

6. The cooking system of claim 5, wherein the optical filter is a subregion of the second radiation guiding element.

7. The cooking system of claim 6, wherein the optical filter is an end region of the second radiation guiding element.

8. The cooking system of claim 7, wherein the optical filter faces the radiation detector.

9. The cooking system of claim 5, wherein the radiation detector is located completely outside of the optical filter.

10. The cooking system of claim 1, wherein the detection unit is designed to detect a temperature of the cookware based on the reflected electromagnetic radiation.

11. The cooking system of claim 1, further comprising a fastening unit designed to fasten the first radiation guiding element and the second radiation guiding element below the set-down plate.

12. The cooking system of claim 11, wherein the first radiation guiding element and the second radiation guiding element are arranged in a self-supporting manner on the fastening unit starting from a fastening region.

13. The cooking system of claim 1, wherein the first radiation guiding element has a first end region and the second radiation guiding element has a second end region, with the first end region and the second end region making contact with the set-down plate.

14. The cooking system of claim 13, wherein the first end region and the second end region are arranged at a distance of at most 5 mm relative to one another when viewed at a right angle onto the set-down plate.

15. The cooking system of claim 1, wherein the radiation source includes a light radiation element designed to emit visible light for illuminating the set-down region.

16. The cooking system of claim 1, wherein the set-down plate is embodied as a hotplate.

17. The cooking system of claim 1, wherein the optical filter is a subregion of the second radiation guiding element.

18. The cooking system of claim 17, wherein the optical filter is an end region of the second radiation guiding element.

19. The cooking system of claim 18, wherein the optical filter faces the radiation detector.

20. The cooking system of claim 1, wherein the radiation detector is located completely outside of the optical filter.

* * * * *